United States Patent
Dreher et al.

(10) Patent No.: US 6,262,159 B1
(45) Date of Patent: Jul. 17, 2001

(54) POLYMER DISPERSION CONTAINING DISPERSED PARTICLES, A DISSOLVED POLYMER, AND AN AMINE

(75) Inventors: Stefan Dreher, Neustadt; Bernd Reck, Grünstadt; Michael Seufert, Bad Dürkheim; Johannes Türk, Böhl-Iggelheim, all of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/479,068

(22) Filed: Jan. 7, 2000

(30) Foreign Application Priority Data

Jan. 8, 1999 (DE) ............................................. 199 00 459

(51) Int. Cl.$^7$ ....................................................... C08L 5/17
(52) U.S. Cl. ......................... 524/245; 524/247; 524/249; 524/501; 524/460; 524/461; 524/833
(58) Field of Search ................................... 524/243, 244, 524/245, 247, 249, 460, 461, 501, 833

(56) References Cited

U.S. PATENT DOCUMENTS

| | | | |
|---|---|---|---|
| 3,784,498 | 1/1974 | Ceska et al. | 524/832 |
| 4,670,505 | 6/1987 | Craig | 524/704 |
| 4,771,100 * | 9/1988 | Das et al. | 524/853 |
| 4,820,762 | 4/1989 | Tsaur | 524/556 |
| 4,839,413 | 6/1989 | Kiehlbauch et al. | 524/556 |
| 4,868,259 | 9/1989 | Burroway et al. | 526/203 |
| 4,954,558 | 9/1990 | Tsaur | 524/556 |
| 5,314,943 | 5/1994 | Steinwand | 524/501 |
| 5,520,725 | 5/1996 | Kato et al. | 523/115 |
| 5,658,993 | 8/1997 | Denzinger et al. | 525/235 |
| 6,051,640 * | 4/2000 | Reck et al. | 524/237 |
| 6,060,557 | 5/2000 | Dahmen et al. | 524/556 |
| 6,070,994 * | 6/2000 | Hummerich et al. | 524/249 |

FOREIGN PATENT DOCUMENTS

| | | | |
|---|---|---|---|
| 0 257 567 | 3/1988 | (EP) . | |
| 0 537 910 | 4/1993 | (EP) . | |
| 0 735 061 | 10/1996 | (EP) . | |
| 1671670 * | 8/1991 | (RU) | 524/244 |
| WO 97/06190 | 2/1997 | (WO) . | |
| WO 97/36943 | 10/1997 | (WO) . | |

* cited by examiner

*Primary Examiner*—Peter Szekely
(74) *Attorney, Agent, or Firm*—Oblon, Spivak, McClelland, Maier & Neustadt, P.C.

(57) ABSTRACT

Described is a polymer dispersion comprising in an aqueous medium (a) dispersed particles of a polymer containing more than from 5 to 20% by weight of α,β-ethylenically unsaturated mono- or dicarboxylic acid, (b) a dissolved polymer containing from 60 to 100% by weight of α,β-ethylenically unsaturated mono- or dicarboxylic acid, and (c) an alkoxylated long-chain amine. Heat-curable compositions are obtained by adding polyfunctional alcohols and, optionally, reaction accelerant. The polymer dispersions and the heat-curable compositions are suitable for use as binders for textile sheetlike structures and for moldings.

12 Claims, No Drawings

POLYMER DISPERSION CONTAINING DISPERSED PARTICLES, A DISSOLVED POLYMER, AND AN AMINE

The present invention relates to a polymer dispersion and to a heat-curable composition comprising it, said dispersion and said composition being suitable as binders for various applications, especially as binders for particulate or fibriform substrates.

To bind wood fibers, textile fibers or natural fibers or to coat wood or mineral substrates it is common to use mixtures of acid-rich solution polymers and low-acid or acid-free emulsion polymers, since using such mixtures it is possible to achieve high mechanical strength and substrate hydrophobicization.

U.S. Pat. No. 5,314,943 describes a low-viscosity fast-curing binder for textile substrates which comprises a mixture of an aqueous emulsion copolymer latex with an aqueous solution copolymer. The aqueous solution copolymer is formed by the copolymerization of an α,β-ethylenically unsaturated monocarboxylic acid and an α,β-ethylenically unsaturated dicarboxylic acid. The emulsion copolymer latex includes units of monomers selected from alkenylaromatics, conjugated diolefins, vinyl acetate, and acrylates.

EP-537 910 disclose mixtures of emulsion polymers, synthesized preferably from styrene and n-butyl acrylate, with acid-rich water-soluble polymers, which when used as binders for coating materials are said to lead to coatings having good substrate wetting and high solvent resistance.

EP-257 567 describes a polymer composition obtainable by emulsion polymerization of ethylenically unsaturated monomers, such as olefins, vinylaromatic compounds, α,β-ethylenically unsaturated carboxylic acids and esters thereof, ethylenically unsaturated dicarboxylic anhydrides or vinyl halides. During the polymerization a water- or alkali-soluble or -dispersible resin having a number-average molecular weight of from about 500 to 20,000 g/mol is added in order to influence the flow properties of the polymer composition. The water- or alkali-soluble or -dispersible resin can have been synthesized, for example, from olefins, vinylaromatic compounds, α,β-ethylenically unsaturated carboxylic acids and esters thereof or ethylenically unsaturated dicarboxylic anhydrides.

Polymer latices prepared by emulsion polymerization in the presence of water-soluble acid-containing polymers, preferably styrene-acrylic acid copolymers, and natural fatty acids has been discribed. The polymer dispersions obtained are said to exhibit little tendency to foaming and therefore to be suitable as binders for wood primers or water-based printing inks.

U.S. Pat. No. 4,670,505 describes a polyacrylate dispersion prepared by emulsion polymerization in the presence of from 0.05 to 5% by weight of a protective colloid, e.g., polyacrylic acid or its alkali metal salts, and from 0.1 to 5% by weight of a water-soluble amino alcohol having 2 to 36 carbon atoms. The resulting dispersion possesses a low viscosity and good pigment binding capacity and is essentially free from gel specks and stable to shearing. With relatively large amounts of polyacrylic acid the composition is said to exhibit very high viscosity, which opposes its use as a binder for fibrous substrates, for example.

It has been found that the known binder systems provide inadequate wetting of polar fibers, such as wood, flax, jute, sisal, hemp, cotton, glass wool or mineral wool. Furthermore, the shear, electrolyte and freeze-thaw stability of the known binders is capable of improvement.

It is an object of the present invention to provide a polymer dispersion, and heat-curable compositions comprising said dispersion, which for a given solids content exhibit high wetting capacity for polar fibers and a desirably low viscosity at the same time.

We have found that this object is achieved by means of a polymer dispersion comprising in an aqueous medium
  a) dispersed particles of a polymer composed of units of ethylenically unsaturated monomers of which more than from 5 to 20% by weight are α,β-ethylenically unsaturated mono- or dicarboxylic acids;
  b) a dissolved polymer containing in copolymerized form from 60 to 100% by weight of at least one α,β-ethylenically unsaturated mono- or dicarboxylic acid, or salts thereof; and
  c) an amine of the formula I

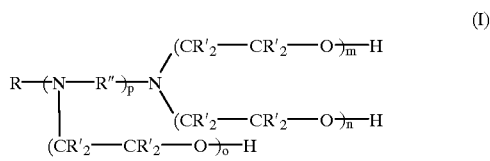

in which
  R is an alkyl or alkylene radical having at least 6 carbon atoms or an alkylphenyl radical having at least 6 carbon atoms in the alkyl group;
  R' independently at each occurrence is H or $C_{1-4}$ alkyl;
  R" is $C_{1-4}$ alkylene;
  m, n and o independently of one another are a number $\geq 0$, with the proviso that at least one value of m, n and o is other than 0,
and p is 0 or 1,
the weight ratio, based on solids, of the dispersed particles to dissolved polymer being in the range from 7:1 to 1:7 and the weight ratio of dissolved polymer to amine being in the range from 20:1 to 2:1;
said polymer dispersion being obtainable by emulsion polymerization of said ethylenically unsaturated monomers in the presence of said dissolved polymer and of said amine of the formula I.

The invention further provides a heat-curable composition comprising a polymer dispersion as described above, a polyfunctional alcohol and, optionally, a reaction accelerant.

The polymer dispersion of the invention comprises a comparatively high fraction of acid monomers. The dispersed particles thus contain more than from 5 to 20% by weight of an α,β-ethylenically unsaturated mono- or dicarboxylic acid. The polymer dispersion further comprises a polymer which is dissolved in the aqueous medium and which contains in copolymerized form from 60 to 100% by weight of α,β-ethylenically unsaturated mono- or dicarboxylic acids. Surprisingly, the polymer dispersion of the invention has a relatively low viscosity. At a solids content of about 40% by weight, the viscosity of the polymer dispersion of the invention is generally in the range from 10 to 2000 mPas, in particular from 30 to 1000 mPas, as measured using a rotational viscometer in accordance with DIN 53019 at 23° C. and a shear rate of 250 $s^{-1}$.

It has been found that two- or three-dimensional structures, especially in the form of textile sheet materials or shaped parts, that have been produced by impregnating particulate or fibriform substrates with the above-described polymer dispersion and then subjecting the impregnated substrates to heat curing, possess high mechanical strength and also a high level of resistance to water and humidity. Particularly advantageous qualities are obtained if the heat-curable composition of the invention used to impregnate said particulate or fibriform substrates comprises not only the polymer dispersion of the invention but also a polyfunctional alcohol and, optionally, a reaction accelerant.

Polymer dispersions containing less than 5% by weight of $\alpha,\beta$-ethylenically unsaturated carboxylic acid in the dispersed polymer particles lead to binders which effect much poorer wetting of polar fibers. The shaped articles obtained with them exhibit much poorer resistance to water than to humid conditions. The inadequate resistance to water and humid conditions of the dispersions containing less than 5% by weight of polymer particles containing carboxylic acid cannot be substantially improved even by adding polyfunctional alcohols and reaction accelerants.

In preferred polymer dispersions of the invention the weight ratio of dispersed polymer particles to dissolved polymer is in the range from 5:1 to 1:5, in particular in the range from 3:1 to 1:3. The weight ratio of dissolved polymer to amine of the formula I is preferably in the range from 1:10 to 3:1.

The dispersed polymer particles are composed of units of ethylenically unsaturated monomers. They are obtainable by free-radical emulsion polymerization of more than from 5 to 20% by weight, based on the total monomers, of at least one $\alpha,\beta$-ethylenically unsaturated mono- or dicarboxylic acid or anhydrides thereof and from 80 to less than 95% by weight of at least one or more different copolymerizable ethylenically unsaturated monomers (principal monomer).

Suitable acid monomers include:

$\alpha,\beta$-ethylenically unsaturated $C_3$–$C_{10}$ monocarboxylic acids, e.g. acrylic acid, methacrylic acid, crotonic acid, dimethacrylic acid, ethylacrylic acid, allylacetic acid or vinylacetic acid; and also $\alpha,\beta$-ethylenically unsaturated $C_4$–$C_8$ dicarboxylic acids, their monoesters and anhydrides, e.g., maleic acid, fumaric acid, itaconic acid, mesaconic acid, methylenemalonic acid, citraconic acid, maleic anhydride, itaconic anhydride or methylmalonic anhydride.

Preferred $\alpha,\beta$-unsaturated mono- or dicarboxylic acids are acrylic acid, methacrylic acid, itaconic acid, maleic acid, fumaric acid and/or crotonic acid. Among the anhydrides, methacrylic anhydride and maleic anhydride are preferred.

The principal monomer is preferably selected from esters of preferably $C_3$–$C_6$ $\alpha,\beta$-monoethylenically unsaturated mono- or dicarboxylic acids, such as acrylic acid, methacrylic acid, maleic acid, fumaric acid, and itaconic acid, with generally $C_1$–$C_{12}$, preferably $C_1$–$C_8$ and, in particular, $C_1$–$C_4$ alkanols.

Particular such esters are methyl, ethyl, n-butyl, isobutyl, tert-butyl and 2-ethylhexyl acrylate and methacrylate;

vinylaromatic compounds, such as styrene, a-methylstyrene, o-chlorostyrene or vinyltoluenes;

vinyl esters of $C_1$–$C_{18}$ mono- or dicarboxylic acids, such as vinyl acetate, vinyl propionate, vinyl n-butyrate, vinyl laurate and vinyl stearate;

butadiene;

linear 1-olefins, branched-chain 1-olefins or cyclic olefins, such as ethene, propene, butene, isobutene, pentene, cyclopentene, hexene, and cyclohexene, for example.

Also suitable are oligoolefins prepared using metallocene catalysis and having a terminal double bond, such as oligopropene or oligohexene, for example. Preferably, however, no ethene or no linear 1-olefin is incorporated into the polymer by copolymerization.

Acrylonitrile, methacrylonitrile.

Vinyl and allyl alkyl ethers having 1 to 40 carbon atoms in the alkyl radical, said alkyl radical possibly carrying further substituents such as a hydroxyl group, an amino or dialkylamino group, or one or more alkoxylated groups, examples being methyl vinyl ether, ethyl vinyl ether, propyl vinyl ether, isobutyl vinyl ether, 2-ethylhexyl vinyl ether, vinyl cyclohexyl ether, vinyl 4-hydroxybutyl ether, decyl vinyl ether, dodecyl vinyl ether, octadecyl vinyl ether, 2-(diethylamino)ethyl vinyl ether, 2-(di-n-butylamino)ethyl vinyl ether, methyldiglycol vinyl ether, and the corresponding allyl ethers, and/or mixtures thereof.

Acrylamides and alkyl-substituted acrylamides, such as acrylamide, methacrylamide, N-tert-butylacrylamide and N-methyl(meth)acrylamide, for example.

Sulfo-functional monomers, such as allylsulfonic acid, methallylsulfonic acid, styrenesulfonate, vinylsulfonic acid, allyloxybenzenesulfonic acid, 2-acrylamido-2-methylpropanesulfonic acid, their corresponding alkali metal or ammonium salts, and/or mixtures thereof, and also sulfopropyl acrylate and sulfopropyl methacrylate, for example.

$C_1$–$C_4$-Hydroxyalkyl esters of $C_3$–$C_6$ mono- or dicarboxylic acids (see above), especially of acrylic acid, methacrylic acid or maleic acid, or their derivatives alkoxylated with from 2 to 50 mol of ethylene oxide, propylene oxide, butylene oxide or mixtures thereof, or esters of the abovementioned acids with $C_1$–$C_{18}$ alcohols alkoxylated with from 2 to 50 mol of ethylene oxide, propylene oxide, butylene oxide or mixtures thereof, examples being hydroxyethyl (meth)acrylate, hydroxypropyl (meth)acrylate, and methylpolyglycol acrylate.

Vinylphosphonic acid, dimethyl vinylphosphonate, and other phosphorus monomers.

Alkylaminoalkyl (meth)acrylates or alkylaminoalkyl (meth)acrylamides or quaternization products thereof, such as, for example, 2-(N,N-dimethylamino)ethyl (meth)acrylate, 3-(N,N-dimethylamino)propyl (meth) acrylate, 2-(N,N,N-trimethylammonium)ethyl (meth) acrylate chloride, 2-dimethylaminoethyl(meth) acrylamide, 3-dimethylaminopropyl(meth)acrylamide, and 3-trimethylammoniumpropyl(meth)acrylamide chloride.

Allyl esters of $C_1$–$C_{30}$ monocarboxylic acids.

N-Vinyl compounds, such as N-vinylformamide, N-vinyl-N-methylformamide, N-vinylpyrrolidone, N-vinylimidazole, 1-vinyl-2-methylimidazole, 1-vinyl-2-methylimidazoline, N-vinylcaprolactam, vinylcarbazole, 2-vinylpyridine, and 4-vinylpyridine.

Diallyldimethylammonium chloride, vinylidene chloride, vinyl chloride, acrolein, methacrolein.

Monomers containing 1,3-diketo groups, such as, for example, acetoacetoxyethyl(meth)acrylate or diacetonacrylamide, monomers containing urea groups, such as ureidoethyl (meth)acrylate, acrylamidoglycolic acid, and methacrylamidoglycolate methyl ether.

Monomers containing silyl groups, such as, for example, trimethoxysilylpropyl methacrylate.

Monomers containing glycidyl groups, such as, for example, glycidyl methacrylate.

Particularly preferred principal monomers are styrene, methyl (meth)acrylate, n-butyl acrylate, ethyl acrylate, 2-ethylhexyl acrylate, vinyl acetate, butadiene, acrylonitrile, acrylamide, hydroxyethyl acrylate, hydroxyethyl (meth) acrylate and glycidyl (meth)acrylate.

The dissolved polymer is a water-soluble polymer obtainable by free-radical polymerization and containing in copolymerized form from 60 to 100% by weight, preferably from 80 to 100% by weight, based on the overall monomer units of the dissolved polymer, of at least one α,β-ethylenically unsaturated mono- or dicarboxylic acid, or salts thereof, such as alkali metal salts, e.g., the sodium salt or potassium salt, and/or ammonium salts. Suitable acid monomers have been mentioned above in connection with the dispersed polymer particles. Acrylic acid, methacrylic acid, itaconic acid, maleic acid, fumaric acid and/or crotonic acid are preferred. In addition to the mono- or dicarboxylic acids the dissolved polymer may also contain from 0 to 40% by weight, preferably from 0 to 20% by weight, of a further monomer in copolymerized form. Monomers suitable for this purpose are the principal monomers mentioned in connection with the dispersed polymer particles. of these, methyl acrylate, ethyl acrylate, n-butyl acrylate, methyl methacrylate, n-butyl methacrylate, t-butyl methacrylate, 2-ethylhexyl acrylate, styrene, acrylamide, acrylonitrile, and vinyl acetate are preferred. (Meth)acrylic acid copolymers, especially (meth)acrylic acid-maleic acid copolymers, are preferred.

The use of dissolved polymers having a weight-average molecular weight of less than 100 kg/mol, preferably less than 70 kg/mol, is preferred. In general, the dissolved polymer has a weight-average molecular weight of more than 0.5 kg/mol.

The amine of the formula I is a surface-active alkoxylated long-chain amine. R is an alkyl or alkenyl radical having at least 6 carbon atoms; the alkenyl radical can be singly or multiply unsaturated—for example, it can be unsaturated up to three times; or else R is an alkylphenyl radical having at least 6 carbon atoms in the alkyl group. R preferably represents alkyl or alkenyl radicals having 10 to 20 carbon atoms. R' independently at each occurrence (i.e., independently within the repeating unit and independently between different repeating units) is H or $C_{1-4}$ alkyl, especially H or methyl. In particularly preferred amines of the formula I, all radicals R' are H. R" is $C_{1-4}$ alkylene, preferably propylene. The indices m, n and o independently of one another are integers $\geq 0$ with the proviso that at least one of m, n and o is other than 0. The index p can adopt the value 0 or 1. The sum (m+n) or, if p=1, (m+n+o) is preferably in the range from 2 to 60, in particular from 4 to 30.

Suitable amines of the formula I are marketed by Elf-Atochem under the trade name NORAMOX (e.g., Noramox C11, S2, S11 or O11). The ethoxylated alkyldiamines DINORAMOX (e.g., Dinoramox S12) are also suitable. Further suitable compounds are available from Akzo under the trade name ETHOMEEN and from BASF (LUTENSOL FA).

The polymer dispersions of the invention generally have a nonvolatile content (solids content) of from 20 to 70% by weight, preferably from 25 to 55% by weight, with particular preference from 40 to 55% by weight. At a solids content of about 40% by weight, the viscosity of the polymer dispersion of the invention is within the range from 10 to 2000 mPas, preferably from 30 to 1000 mPas, measured with a rotational viscometer in accordance with DIN 53019 at 23° C. and a shear rate of 250 $s_{-1}$.

The polymer dispersion of the invention can be used to prepare a heat-curable composition which is likewise provided by the present invention. The heat-curable composition of the invention comprises not only a polymer dispersion as set out above but also a polyfunctional alcohol (other than the amine of the formula I) and, optionally, a reaction accelerant.

Particularly preferred heat-curable compositions of the invention contain, based on the overall weight of nonvolatile constituents:

from 40 to 60% by weight of dispersed polymer particles;

from 20 to 40% by weight of dissolved polymer;

from 6 to 10% by weight of amine of the formula I;

up to 15% by weight of polyfunctional alcohol; and from 0 to 5% by weight of reaction accelerant.

The reaction accelerant, if used, is employed preferably in an amount of up to 5% by weight, e.g., from 0.1 to 5% by weight, preferably less than 3% by weight, based on the overall weight of nonvolatile constituents in the composition.

The polyfunctional alcohol is generally used in an amount, relative to the polymer dispersion, such that the weight ratio of dissolved polymer to polyfunctional alcohol is in the range from 100:1 to 1:1, in particular from 50:1 to 2:1 and, with particular preference, from 30:1 to 2.5:1, based on nonvolatile fractions.

Examples of suitable polyfunctional alcohols are polyhydric alcohols, such as glycol, glycerol, trimethylolpropane or pentaerythritol. Particular preference is given to alkanolamines having at least two hydroxyl groups, especially ethanolamines, i.e., compounds having aliphatic hydroxyl groups in the β-position with respect to an amine or amide function. Addition of the alkanolamine results in more rapid curing of the polymer dispersions at a given curing temperature, or curing at a lower temperature with a given curing time. Addition of an alkanolamine also improves the formation of a film by the composition.

Suitable alkanolamines are those of the formula:

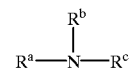

where $R^a$ is a hydrogen atom, a $C_1$–$C_5$ alkyl group or a $C_1$–$C_{10}$ hydroxyalkyl group and $R^b$ and $R^c$ are a $C_1$–$C_{10}$ hydroxyalkyl group.

With particular preference, $R^b$ and $R^c$ independently of one another are a $C_2$–$C_5$ hydroxyalkyl group and $R^a$ is a hydrogen atom, a $C_1$–$C_5$ alkyl group or a $C_2$–$C_5$ hydroxyalkyl group.

Examples that may be mentioned of alkanolamines are diethanolamine, triethanolamine, diisopropanolamine, triisopropanolamine, methyldiethanolamine, butyldiethanolamine and methyldiisopropanolamine. Triethanolamine is particularly preferred.

Further suitable alkanolamines are those selected from water-soluble, linear or branched aliphatic compounds containing per molecule at least two functional amino groups of the type (a) or of the type (b)

-continued

(b)

where R is hydroxyalkyl and R' is alkyl.

Particularly useful compounds of this type are the compounds of the following formulae:

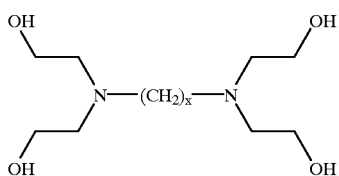

where x is from 2 to 12, especially 2 or 6,

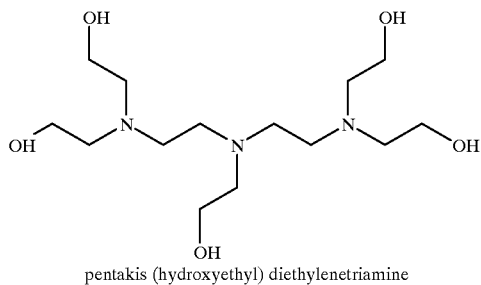
pentakis (hydroxyethyl) diethylenetriamine and also products of the reaction of polyethylenimines (preferably having a degree of polymerization of $\leq 20$) with one equivalent of ethylene oxide per hydrogen atom attached to nitrogen atoms.

In general, triethanolamine and ethoxylated polymeric alkylenimines, such as N,N,N',N'-tetrakis(hydroxyethyl) ethylenediamine, are preferred.

The heat-curable composition of the invention may optionally include a reaction accelerant. Suitable such accelerants are strong acids, such as sulfuric acid, p-toluenesulfonic acid, hydrochloric acid, trichloroacetic acid, and chlorosulfonic acid, for example. Particularly suitable reaction accelerants are phosphorus compounds, such as hypophosphorous acid, phosphoric acid or polyphosphoric acids and/or their alkali metal and alkaline earth metal salts, or polyvinylphosphonic acids. Also suitable are tetrafluoroboric acid or alkali metal tetrafluoroborates. Salts of Mn(II), Ca(II), Zn(II), Al(III), Sb(III) or Ti(V) can also be added as reaction accelerants.

The polymer dispersion of the invention is prepared preferably by aqueous emulsion polymerization, a batchwise, semicontinuous or continuous procedure being possible. It has been found advantageous to include some or all of the dissolved polymer and the amine of the formula I, in the form of an aqueous solution, in the initial charge to the reactor and to meter in the monomers for forming the dispersed polymer particles in the form of a monomer feed stream or, less preferably, in the form of a preemulsion. The preemulsion can be stabilized, for example, by portions of the surface-active amine of the formula I.

The polymerization is preferably conducted in the presence of compounds which form free radicals (initiators). The amount required of these compounds is preferably from 0.05 to 10, with particular preference from 0.2 to 5% by weight, based on the monomers used in the polymerization.

Examples of suitable polymerization initiators are peroxides, hydroperoxides, peroxodisulfates, percarbonates, peroxo esters, hydrogen peroxide, and azo compounds. Examples of initiators, which can be soluble in water or else insoluble in water, are hydrogen peroxide, dibenzoyl peroxide, dicyclohexyl peroxodicarbonate, dilauroyl peroxide, methyl ethyl ketone peroxide, di-tert-butyl peroxide, acetylacetone peroxide, tert-butyl hydroperoxide, cumene hydroperoxide, tert-butyl perneodecanoate, tert-amyl perpivalate, tert-butyl perpivalate, tert-butyl perneohexanoate, tert-butyl per-2-ethylhexanoate, tert-butyl perbenzoate, lithium, sodium, potassium and ammonium peroxodisulfates, azodiisobutyronitrile, 2,2'-azobis(2-amidinopropane) dihydrochloride, 2-(carbamoylazo) isobutyronitrile, and 4,4'-azobis(4-cyanovaleric acid). The known redox initiator systems as well, such as $H_2O_2$/ascorbic acid or t-butyl hydroperoxide/sodium hydroxymethanesulfinate, for example, can be used as polymerization initiators.

The initiators can be employed alone or in a mixture with one another, examples being mixtures of hydrogen peroxide and sodium peroxodisulfate. For polymerization in an aqueous medium it is preferred to use water-soluble initiators.

In order to prepare polymers having a low average molecular weight it is often judicious to conduct the copolymerization in the presence of regulators. Customary regulators can be used for this purpose, examples being organic compounds containing SH groups, such as 2-mercaptoethanol, 2-mercaptopropanol, mercaptoacetic acid, tert-butyl mercaptan, n-octyl mercaptan, n-dodecyl mercaptan and tert-dodecyl mercaptan, hydroxylammonium salts such as hydroxylammonium sulfate, formic acid, sodium bisulfite, or isopropanol. The polymerization regulators are generally used in amounts of from 0.05 to 5% by weight, based on the monomers.

In order to prepare copolymers of relatively high molecular weight it is often judicious to conduct the polymerization in the presence of crosslinkers. Such crosslinkers are compounds having two or more ethylenically unsaturated groups, such as, for example, diacrylates or dimethacrylates of at least dihydric saturated alcohols, examples being ethylene glycol diacrylate, ethylene glycol dimethacrylate, 1,2-propylene glycol diacrylate, 1,2-propylene glycol dimethacrylate, 1,4-butanediol diacrylate, 1,4-butanediol dimethacrylate, hexanediol diacrylate, hexanediol dimethacrylate, neopentyl glycol diacrylate, neopentyl glycol dimethacrylate, 3-methylpentanediol diacrylate and 3-methylpentanediol dimethacrylate. The acrylic and methacrylic esters of alcohols having more than 2 OH groups can also be used as crosslinkers, an example being trimethylolpropane triacrylate or trimethylolpropane trimethacrylate. A further class of crosslinkers are diacrylates or dimethacrylates of polyethylene glycols or polypropylene glycols having molecular weights of in each case from 200 to 9000.

In addition to the homopolymers of ethylene oxide or propylene oxide it is also possible to use block copolymers of ethylene oxide and propylene oxide or copolymers of ethylene oxide and propylene oxide containing the ethylene oxide and propylene oxide units randomly distributed. The oligomers of ethylene oxide and/or propylene oxide are also suitable for preparing the crosslinkers, examples being diethylene glycol diacrylate, diethylene glycol dimethacrylate, triethylene glycol diacrylate, triethylene glycol dimethacrylate, tetraethylene glycol diacrylate and/or tetraethylene glycol dimethacrylate.

Further suitable crosslinkers include vinyl acrylate, vinyl methacrylate, vinyl itaconate, divinyl adipate, butanediol divinyl ether, trimethylolpropane trivinyl ether, allyl acrylate, allyl methacrylate, pentaerythritol triallyl ether, triallylsucrose, pentaallylsucrose, methylenebis(meth) acrylamide, divinylethyleneurea, divinylpropyleneurea, divinylbenzene, divinyldioxane, triallyl cyanurate, tetraallylsilane, tetravinylsilane and bis- or polyacrylic siloxanes (e.g., Tegomers® from Th. Goldschmidt AG). The crosslinkers are used preferably in amounts of from 10 ppm to 5% by weight, based on the monomers to be polymerized.

The dispersion medium for the polymer dispersion of the invention is preferably water. However, it is also possible for water-miscible organic solvents, such as alcohols or ketones, examples being methanol, ethanol, n-propanol, isopropanol, acetone, and ethyl methyl ketone, to be present in a proportion of up to 30% by volume.

In addition to the stabilization afforded by the dissolved polymer and by the amine of the formula I, the dispersed polymer particles can also be stabilized by means of further surface-active auxiliaries, such as emulsifiers or protective colloids. In general, however, the presence of further surface-active auxiliaries is not preferred. Suitable emulsifiers are anionic emulsifiers, such as alkylbenzenesulfonic acids, sulfonated fatty acids, sulfosuccinates, fatty alcohol sulfates, alkylphenol sulfates and fatty alcohol ether sulfates; nonionic emulsifiers, such as alkylphenol ethoxylates, primary alcohol ethoxylates, fatty acid ethoxylates, alkanolamide ethoxylates, ethylene oxide-propylene oxide block copolymers, and alkylpolyglycosides; and cationic and amphoteric emulsifiers, such as quaternized amino alkoxylates, alkylbetaines, alkylamidobetaines and sulfobetaines. Examples of typical protective colloids are cellulose derivatives, starch derivatives, and polyvinyl alcohol.

The polymer dispersions or heat-curable compositions of the invention are used in particular as binders for the production of two- or three-dimensional structures, such as textile sheet materials or moldings, from particulate or fibriform substrates, such as fibers, slivers or chips. The two- or three-dimensional structures are obtainable by impregnating the particulate or fibriform substrate with a polymer dispersion or heat-curable composition of the invention and curing the impregnated substrate. The curing temperatures are generally from 100 to 200° C.

The substrates can be substrates made from renewable raw materials or from synthetic or natural fibers, such as those from rags, for example. As renewable raw materials mention may be made in particular of sisal, jute, flax, coconut fiber, kenaf, banana fiber, hemp, and cork. Wood fibers or wood chips are particularly preferred.

The moldings preferably have a density of from 0.2 to 1.4 g/cm$^3$ at 23° C.

Particularly suitable moldings are sheets and shaped parts having an irregular contour. Their thickness is generally at least 1 mm, preferably at least 2 mm, and their surface area is typically from 200 to 200,000 cm$^2$. Consideration may be given, in particular, to interior automotive parts, such as interior door trim, dashboards, and parcel shelves.

The amount by weight of the binder used is generally from 0.5 to 40% by weight, preferably from 1 to 30% by weight (binder solids), based on the substrate (fibers, slivers or chips).

The fibers, slivers or chips can be coated directly with the binder or mixed with the aqueous binder. The viscosity of the aqueous binder is preferably (and especially when producing moldings from wood fibers or wood chips) adjusted to from 10 to 10,000, with particular preference to from 50 to 5000 and, with very particular preference, to from 100 to 2500 mPa·s (DIN 53019, rotational viscometer at 250 s$^{-1}$).

The mixture of fibers, slivers and chips and the binder can be subjected to initial drying at temperatures, for example, of from 10 to 150° C. and then to compression molding to form the moldings at temperatures, for example, of from 50 to 250° C., preferably from 100 to 240° C. and, with particular preference, from 120 to 225° C. under pressures of generally from 2 to 1000 bar, preferably from 10 to 750 bar, with particular preference from 20 to 500 bar.

The binders are particularly suitable for producing woodbase materials such as wood chipboards and wood fiberboards (cf. Ullmanns Encyclopädie der technischen Chemie, 4$^{th}$ edition 1976, volume 12, pp. 709–727), which can be produced by gluing disintegrated wood, such as wood chips and wood fibers, for example. The water resistance of woodbase materials can be enhanced by adding to the binder a customary commercial aqueous paraffin dispersion or other hydrophobicizing agents, or adding said hydrophobicizing agents beforehand or subsequently to the fibers, slivers or chips.

Chipboard production is widely known and is described, for example, in H. J. Deppe, K. Ernst Taschenbuch der Spanplattentechnik, 2$^{nd}$ edition, Verlag Leinfelden 1982.

It is preferred to use chips whose average size is from 0.1 to 4 mm, in particular from 0.2 to 2 mm, and which contain less than 6% by weight of water. However, it is also possible to use considerably coarser chips and those with a higher moisture content. The binder is applied with great uniformity to the wood chips, the weight ratio of binder solids to wood chips preferably being from 0.02:1 to 0,3:1. Uniform distribution can be achieved, for example, by spraying the binder in finely divided form onto the chips.

The glued wood chips are then scattered out to form a layer with a highly uniform surface, the thickness of the layer being guided by the desired thickness of the finished chipboard. The scattered layer is pressed at a temperature of from 100 to 250° C., for example, preferably from 120 to 225° C., by applying pressures of usually from 10 to 750 bar, to form a board. The required press times may vary within a wide range and are generally from 15 seconds to 30 minutes.

The wood fibers of appropriate quality required to produce medium density fiberboard (MDF) panels from the binders can be produced from barkless wood chips by milling in special mills or refiners at temperatures of about 180° C.

For gluing, the wood fibers are generally swirled up in a stream of air and the binder is introduced through nozzles into the resultant fiber stream (blow-line process). The ratio of wood fiber to binder based on the dry-matter content or solids content is usually from 40:1 to 2:1, preferably from 20:1 to 4:1. The glued fibers are dried in the fiber stream at temperatures of, for example, from 130 to 180° C., scattered out to form a fiber web, and pressed under pressures of from 10 to 50 bar to form boards or moldings.

Alternatively, as described for example in DE-A-24 17 243, the glued wood fibers can also be processed to a transportable fiber mat. This intermediate can then be processed further to boards or shaped parts, such as door interior trim panels of motor vehicles, for example, in a second, temporally and spatially separate step.

Other natural fiber substances as well, such as sisal, jute, hemp, flax, coconut, banana and other fibers, can be processed with the binders to form boards and shaped parts. The natural fiber materials can also be used in mixtures with plastic fibers, such as polypropylene, polyethylene, polyester, polyamides or polyacrylonitrile. In this case the plastic fibers may also function as cobinders in addition to the binder of the invention. The proportion of plastic fibers in this case is preferably less than 50% by weight, in particular less than 30% by weight and, with very particular preference, less than 10% by weight, based on all chips, slivers or fibers. The fibers can be processed by the method used for the wood fiberboards. Alternatively, preformed natural fiber mats can be impregnated with the binders of the invention, with or without the addition of a wetting auxiliary. The impregnated mats, in the binder-moist or predried state, are then pressed at temperatures from 100 to 250° C. under pressures of from 10 to 100 bar, for example, to form boards or shaped parts.

The substrates impregnated with the binders of the invention preferably have a residual moisture content on pressing of 3–20% by weight, based on the substrate to be bound.

The moldings obtained in accordance with the invention feature low water absorption, little increase in thickness (swelling) after storage in water, and good strength and are formaldehyde free.

In addition, the compositions of the invention can be used as binders for coating materials and impregnating materials for boards made of organic and/or inorganic fibers, nonfibrous mineral fillers, and starch and/or aqueous polymer dispersions. The coating and impregnating materials impart a high flexural modulus to the boards. The production of such boards is known.

Boards of this kind are commonly used as soundproofing panels. The thickness of the panels is usually within the range from about 5 to 30 mm, preferably in the range from 10 to 25 mm. The edge length of the square or rectangular panels is usually in the range from 200 to 2000 mm.

In addition, the compositions of the invention may include the auxiliaries customary in coating and impregnating technology. Examples of such auxiliaries are finely divided inert fillers, such as aluminum silicates, quartz, precipitated or pyrogenic silica, light and heavy spar, talc, dolomite or calcium carbonate; color pigments, such as titanium white, zinc white, iron oxide black, etc., foam inhibitors, such as modified dimethylpolysiloxanes, and adhesion promoters, and also preservatives.

The components of the composition of the invention are generally present in the coating material in an amount of from 1 to 65% by weight. The proportion of the inert fillers is generally from 0 to 85% by weight, the proportion of water being at least 10% by weight.

The compositions are employed in a customary manner by application to a substrate, for example, by spraying, rolling, pouring or impregnating. The amounts applied, based on the dry-matter content of the composition, are generally from 2 to 100 g/m$^2$.

The amounts of additives to be used are known to the skilled worker and are guided in each individual case by the desired properties and the intended application.

The compositions of the invention can also be used as binders for insulating materials made from inorganic fibers, such as mineral fibers and glass fibers. Insulating materials of this kind are produced industrially by spinning melts of the corresponding mineral raw materials; see US-A-2,550,465, US-A-2,604,427, US-A-2,830,648, EP-A-354 913 and EP-A-567 480. The composition is then sprayed onto the freshly produced, still hot inorganic fibers. The water then largely evaporates and the composition remains, in essentially uncured form, adhering as a viscous mass to the fibers. A continuous, binder-containing fiber mat produced in this way is transported on by means of appropriate conveyor belts through a curing oven. In the oven, the mat cures at temperatures in the range from about 100 to 200° C. to form a rigid matrix. After curing, the mats of insulating material are processed appropriately.

The predominant fraction of the mineral fibers or glass fibers used in the insulating materials has a diameter in the range from 0.5 to 20 μm and a length in the range from 0.5 to 10 cm.

The compositions of the invention are further suitable as binders for textile sheet materials, such as fiber webs.

Examples of fiber webs that may be mentioned are webs of cellulose, cellulose acetate, esters and ethers of cellulose, cotton, hemp, animal fibers, such as wool or hair, and, in particular, webs of synthetic or inorganic fibers, examples being aramid, carbon, polyacrylonitrile, polyester, mineral, PVC, or glass fibers.

In the case of use as binders for fiber webs, the compositions of the invention may include, for example, the following additives: silicates, silicones, boron compounds, lubricants, wetting agents.

Preference is given to glass fiber webs. The unbonded fiber webs (untreated fiber webs), especially of glass fibers, are bound, i.e., consolidated, by the binder of the invention.

For this purpose the binder of the invention is applied to the untreated fiber web by means, for example, of coating, impregnating or soaking in a weight ratio of fiber to binder (solids) of from 10:1 to 1:1, with particular preference from 6:1 bis 3:1.

In this case the binder is used preferably in the form of a diluted composition containing 95 to 40% water.

Application of the binder to the untreated fiber web is generally followed by drying at, preferably, from 100 to 400° C., in particular from 130 to 280° C., with very particular preference from 130 to 230° C., over a period of preferably from 10 seconds to 10 minutes, in particular from 10 seconds to 3 minutes.

The bonded fiber web obtained has high strength in the dry and wet states. In particular, the binders of the invention permit short drying times and also low drying temperatures.

The bonded fiber webs, especially glass fiber webs, are suitable for use as or in roofing membranes, as base materials for wallpapers, or as inliners or base material for floor coverings made, for example, from PVC.

For use as roofing membranes, the bonded fiber webs are generally coated with bitumen.

The aqueous compositions of the invention can also be used to produce foamed boards or moldings. For this purpose the water present in the composition is first of all removed down to a level of <20% by weight at temperatures of <100° C. The viscous composition thus obtained is then foamed at temperatures >100° C., preferably from 120 to 300° C. Examples of blowing agents which can be used are the residual water still present in the mixture and/or the gaseous reaction products that form in the course of the curing reaction. However, commercially customary blowing agents can also be added. The resultant crosslinked polymer foams can be used, for example, for heat insulation and for soundproofing.

The compositions of the invention can also be used to produce laminates, for decorative applications, for example, by impregnating paper and then carrying out gentle drying, in accordance with the known processes. In a second step, these laminates are laminated onto the substrate to be coated, under pressure and with heat, the conditions being chosen such that curing of the binder takes place.

In addition, the compositions of the invention can be used to produce sandpaper and other abrasives by the production techniques customarily carried out with phenolic resin binders. In the production of sandpapers, a layer of the binders of the invention is first of all applied (judiciously 10 g/m²) as base binder to an appropriate backing paper. The desired amount of particulate abrasive is scattered into the wet base binders. After initial drying, a binder topcoat is applied (e.g., 5 g/m²). The paper coated in this way is then cured by heating at 170° C. for another 5 minutes.

The polymer dispersions and heat-curable compositions of the invention are suitable, furthermore, as core sand binders for producing casting molds and cores for metal casting according to conventional processes, and also as binders for mold insulating boards.

The polymer dispersions and heat-curable compositions of the invention are also suitable as binders for coatings, heat sealing lacquers, and laminating adhesives.

The examples which follow are intended to illustrate the invention further. The nonvolatiles content (solids content) was determined from the weight loss of a 1 g sample dried at 120° C. for 2 h in a circulating-air drying cabinet. The viscosity of the samples was determined with the aid of a rotational viscometer (Rheomat) from Paar Physica at a shear rate of 250 s$^{-1}$ at 23° C. in accordance with DIN 53019. The K values of the water-soluble polymers (dissolved polymer) were measured in 1% strength aqueous solution in analogy to DIN 53726.

EXAMPLE 1

A 4 l glass vessel with anchor stirrer (220 rpm) was charged with 356 g of water, 1076 g of a 45% strength by weight aqueous solution of an acrylic acid-maleic acid copolymer (composition AA:MA 70:30% by weight; pH 1.7; K value 17), and 300 g of a 40% strength by weight aqueous solution of Lutensol FA 12 (from BASF, ethoxylated oleylmonoamine, average degree of ethoxylation=12). At an internal temperature of 90° C., 5% by weight of the total amount of a feed stream 1 and 10% by weight of the total amount of a feed stream 2 were added. The reaction mixture was initially polymerized at 90° C. for 10 minutes. Thereafter, at 90° C., the remainder of feed stream 1 was supplied continuously over the course of 3 h and the remainder of feed stream 2 was supplied continuously over the course of 3.5 h, the two feed streams being kept spatially separate. The polymer prepared in this way contains 49.0% of nonvolatile components and has a pH of 1.9. The viscosity of the resulting polymer dispersion is 501 mPas.

| Feed stream 1: | 680 g of styrene |
| --- | --- |
| | 80 g of methacrylic acid |
| | 40 g of 2-hydroxyethyl acrylate |
| Feed stream 2: | 150 g of deionized water |
| | 8 g of sodium peroxodisulfate |

EXAMPLE 2

A 4 l glass vessel with anchor stirrer (120 rpm) was charged with 472 g of water, 960 g of a 50% strength by weight aqueous solution of an acrylic acid-maleic acid copolymer (composition AA:MA 50:50% by weight; pH 1.7; K value 12), and 300 g of a 40% strength by weight aqueous solution of Lutensol FA 12 (from BASF, ethoxylated oleylmonoamine, average degree of ethoxylation=12). At an internal temperature of 90° C., 5% by weight of the total amount of a feed stream 1 and 10% by weight of the total amount of a feed stream 2 were added. The reaction mixture was initially polymerized at 90° C. for 10 minutes. Thereafter, at 90° C., the remainder of feed stream 1 was supplied continuously over the course of 3 h and the remainder of feed stream 2 was supplied continuously over the course of 3.5 h, the two feed streams being kept spatially separate. The polymer prepared in this way contains 49.1% of nonvolatile components and has a pH of 1.9. The viscosity of the resulting polymer dispersion is 96 mPas.

| Feed stream 1: | 680 g of styrene |
| --- | --- |
| | 80 g of methacrylic acid |
| | 40 g of 2-hydroxyethyl acrylate |
| Feed stream 2: | 150 g of deionized water |
| | 8 g of sodium peroxodisulfate |

EXAMPLE 3

A 4 l glass vessel with anchor stirrer (120 rpm) was charged with 200 g of water, 1071 g of a 45% strength by weight aqueous solution of an acrylic acid-maleic acid copolymer (composition AA:MA 70:30% by weight; pH 1.7; K value 17), and 260 g of a 40% strength by weight aqueous solution of Lutensol FA 12 (from BASF, ethoxylated oleylmonoamine, average degree of ethoxylation=12). At an internal temperature of 90° C., 5% by weight of the total amount of a feed stream 1 and 10% by weight of the total amount of a feed stream 2 were added. The reaction mixture was initially polymerized at 90° C. for 10 minutes. Thereafter, at 90° C., the remainder of feed stream 1 was supplied continuously over the course of 3 h and the remainder of feed stream 2 was supplied continuously over the course of 3.5 h, the two feed streams being kept spatially separate. The polymer prepared in this way contains 48.1% of nonvolatile components and has a pH of 1.9. The viscosity of the resulting polymer dispersion is 1730 mPas.

| Feed stream 1: | 161 g of deionized water |
| --- | --- |
| | 680 g of styrene |
| | 80 g of methacrylic acid |
| | 40 g of 2-hydroxyethyl acrylate |
| | 40 g of Lutensol FA 12 (40% strength aqueous solution) |
| Feed stream 2: | 150 g of deionized water |
| | 8 g of sodium peroxodisulfate |

EXAMPLE 4

A 4 l glass vessel with anchor stirrer (120 rpm) was charged with 851 g of water, 786 g of a 45% strength by weight aqueous solution of an acrylic acid-maleic acid copolymer (composition AA:MA 70:30% by weight; pH 1.7; K value 17), and 225 g of a 40% strength by weight aqueous solution of Lutensol FA 12 (from BASF, ethoxylated oleylmonoamine, average degree of ethoxylation=12). At an internal temperature of 90° C., 5% by weight of the total amount of a feed stream 1 and 10% by weight of the total amount of a feed stream 2 were added. The reaction mixture was initially polymerized at 90° C. for 10 minutes. Thereafter, at 90° C., the remainder of feed stream 1 was supplied continuously over the course of 3 h and the remainder of feed stream 2 was supplied continuously over the course of 3.5 h, the two feed streams being kept spatially separate. The polymer prepared in this way contains 38.6% of nonvolatile components and has a pH of 2.3. The viscosity of the resulting polymer dispersion is 666 mpas.

| | |
|---|---|
| Feed stream 1: | 510 g of methyl methacrylate |
| | 60 g of methacrylic acid |
| | 30 g of glycidyl methacrylate |
| Feed stream 2: | 100 g of deionized water |
| | 6 g of sodium peroxodisulfate |

EXAMPLE 5

A 4 l glass vessel with anchor stirrer (120 rpm) was charged with 307 g of water, 786 g of a 45% strength by weight aqueous solution of an acrylic acid-maleic acid copolymer (composition AA:MA 70:30% by weight; pH 1.7; K value 17), and 225 g of a 40% strength by weight aqueous solution of Lutensol FA 12 (from BASF, ethoxylated oleylmonoamine, average degree of ethoxylation=12). At an internal temperature of 90° C., 5% by weight of the total amount of a feed stream 1 and 10% by weight of the total amount of a feed stream 2 were added. The reaction mixture was initially polymerized at 90° C. for 10 minutes. Thereafter, at 90° C., the remainder of feed stream 1 was supplied continuously over the course of 3 h and the remainder of feed stream 2 was supplied continuously over the course of 3.5 h, the two feed streams being kept spatially separate. The polymer prepared in this way contains 47.4% of nonvolatile components and has a pH of 1.9. The viscosity of the resulting polymer dispersion is 1200 mPas.

| | |
|---|---|
| Feed stream 1: | 450 g of 2-ethylhexyl acrylate |
| | 60 g of styrene |
| | 60 g of methacrylic acid |
| | 30 g of 2-hydroxyethyl acrylate |
| Feed stream 2: | 94 g of deionized water |
| | 6 g of sodium peroxodisulfate |

EXAMPLE 6

A 4 l glass vessel with anchor stirrer (120 rpm) was charged with 820 g of water, 779 g of a 46% strength by weight aqueous solution of an acrylic acid-maleic acid copolymer (composition AA:MA 90:10% by weight; pH 1.7; K value 14), and 224 g of a 40% strength by weight aqueous solution of Lutensol FA 12 (from BASF, ethoxylated oleylmonoamine, average degree of ethoxylation=12). At an internal temperature of 90° C., 5% by weight of the total amount of a feed stream 1 and 10% by weight of the total amount of a feed stream 2 were added. The reaction mixture was initially polymerized at 90° C. for 10 minutes. Thereafter, at 90° C., the remainders of feed streams 1 and 2 were supplied continuously over the course of 3 h, the two feed streams being kept spatially separate. The polymer prepared in this way contains 39.5% of nonvolatile components and has a pH of 2.1. The viscosity of the resulting polymer dispersion is 98 mPas.

| | |
|---|---|
| Feed stream 1: | 255 g of styrene |
| | 225 g of methyl methacrylate |
| | 60 g of methacrylic acid |
| | 30 g of 2-hydroxyethyl acrylate |
| Feed stream 2: | 94 g of deionized water |
| | 6 g of sodium peroxodisulfate |

EXAMPLE 7

A 4 l glass vessel with anchor stirrer (220 rpm) was charged with 710 g of water, 537 g of a 50% strength by weight aqueous solution of an acrylic acid-maleic acid copolymer (composition AA:MA 50:50% by weight; pH 1.7; K value 12), and 68 g of Dinoramox S12 (from Elf-Atochem, ethoxylated tallow fatty propylenediamine, average degree of ethoxylation=12). At an internal temperature of 90° C., 5% by weight of the total amount of a feed stream 1 and 10% by weight of the total amount of a feed stream 2 were added. The reaction mixture was initially polymerized at 85° C. for 10 minutes. Thereafter, at 90° C., the remainder of feed stream 1 was supplied continuously over the course of 3 h and the remainder of feed stream 2 was supplied continuously over the course of 3.5 h, the two feed streams being kept spatially separate. The polymer prepared in this way contains 41.1% of nonvolatile components and has a pH of 2.1. The viscosity of the resulting polymer dispersion is 159 mPas.

| | |
|---|---|
| Feed stream 1: | 265 g of styrene |
| | 265 g of methyl methacrylate |
| | 70 g of methacrylic anhydride |
| Feed stream 2: | 60 g of deionized water |
| | 5 g of sodium peroxodisulfate |

Comparative Example C-1

A 4 l glass vessel with anchor stirrer (220 rpm) was charged with 361 g of water, 1076 g of a 45% strength by weight aqueous solution of an acrylic acid-maleic acid copolymer (composition AA:MA 70:30% by weight; pH 1.7; K value 17), and 300 g of a 40% strength by weight aqueous solution of Lutensol FA 12 (from BASF, ethoxylated oleylmonoamine, average degree of ethoxylation=12). At an internal temperature of 90° C., 5% by weight of the total amount of a feed stream 1 and 10% by weight of the total amount of a feed stream 2 were added. The reaction mixture was initially polymerized at 90° C. for 10 minutes. Thereafter, at 90° C., the remainder of feed stream 1 was supplied continuously over the course of 3 h and the remainder of feed stream 2 was supplied continuously over the course of 3.5 h, the two feed streams being kept spatially separate. The polymer prepared in this way contains 48.5% of nonvolatile components and has a pH of 1.8. The viscosity of the resulting polymer dispersion is 621 mPas.

| | |
|---|---|
| Feed stream 1: | 680 g of styrene |
| | 80 g of methyl methacrylate |
| | 40 g of 2-hydroxyethyl acrylate |
| Feed stream 2: | 150 g of deionized water |
| | 8 g of sodium peroxodisulfate |

Comparative Example C-2

A 4 l glass vessel with anchor stirrer (120 rpm) was charged with 550 g of water. At an internal temperature of 93° C., 5% by weight of the total amount of a feed stream 1 and 10% by weight of the total amount of a feed stream 2 were added. The reaction mixture was initially polymerized at 93° C. for 10 minutes. Then, at 93° C., the remainder of feed stream 1 was added over the course of 3 h and the remainder of feed stream 2 was supplied continuosly over the course of 3.5 h, the two feeds being kept spatially separate. The polymer dispersion was subsequently neutralized by adding 25% strength by weight aqueous ammonia solution. The polymer prepared in this way contains 50.5% of nonvolatile fractions and has a pH of 7.4. The viscosity of the resulting polymer dispersion is 1465 mpas.

| Feed stream 1: | 532 g of deionized water |
| | 31 g of Dowfax 2A1 (from Dow, 45% strength by weight solution of a doubly ring-sulfonated alkyl biphenyl ether) |
| | 1190 g of styrene |
| | 140 g of methacrylic acid |
| | 70 g of 2-hydroxyethyl acrylate |
| Feed stream 2: | 200 g of deionized water |
| | 8 g of sodium peroxodisulfate |

Comparative Example C-3

The polymer dispersion described in Comparative Example C-2 is mixed with stirring with 60% by weight (based on the solids content of the polymer dispersion) of a 50% strength by weight aqueous solution of an acrylic acid-maleic acid copolymer (composition AA:MA 50:50% by weight; pH 1.7; K value 12). The material obtained in this way contains 50.1% of nonvolatile components and has a pH of 1.6. The viscosity of the mixture is 2240 mpas.

The above examples show that stable polymer dispersions of low viscosity are obtained by emulsion polymerization in the presence of the dissolved polymer and of the amine of the formula I. The polymer dispersions of the invention include a high fraction of carboxyl groups formed by the acid monomers present in the dispersed polymer particles and by the substantial amounts of acid-rich dissolved polymer in the serum.

Testing of the examples as binders for natural fiber mats

For testing as binders, 6% by weight of triethanolamine and 2% by weight of hypophosphorous acid (based on nonvolatile fractions of the polymer dispersion) are added to each of the selected examples and comparative examples and the resulting formulations are then diluted to a solids content of 20% by adding deionized water. The resulting compositions were used as binders for binding jute-sisal mats.

A fiber mat composed of a 1:1 mixture of jute and sisal fibers (average basis weight 1200 g/m$^2$, residual moisture content 7%, manufactured by Braunschweiger Jute- und Flachs Industriebetriebe GmbH) is impregnated using a padder roll with a 20% strength binder liquor such that, based on the dry fiber weight, 30% by weight of nonvolatile binder fractions are applied.

The impregnated fiber mats (35×30 cm) are dried in a circulating-air drying cabinet at 50° C. to a residual moisture content of 10%, based on dry fibers, and are then pressed using a hydraulic press at a temperature of 200° C. and a pressure of 1.5 N/mm$^2$ for 60 seconds.

The thickness swelling (TS) is determined as the relative increase in thickness of 2×2 cm sections of the pressed fiber mats after 2 hours or 24 hours of storage in water at 23° C. To determine the climatic stability, 3×10 cm sections of the pressed fiber mats are stored in a controlled-climate cabinet at 80° C. and 90% relative atmospheric humidity for 1 and 7 days, respectively. The strength (S) or decrease in strength of the test specimens is then evaluated relatively to one another using ratings (rating 1=very high strength, to rating 5=very low strength). Furthermore, the bowing (B) of 3 cm wide sections of the fiber mats stored under the abovementioned humid climate conditions for 1 or 7 days, respectively, is investigated. The width separating the supports of the sample specimens in the controlled-climate cabinet is 23 cm.

For the selected examples and comparative examples, the values depicted in Table 1 were obtained:

The results set out in Table 1 show clearly that the compositions of the invention (Examples 2, 3, 6 and 7) result in fiber mats having high mechanical strength and water resistance even after prolonged storage of the boards under humid climatic conditions. Analogous compositions containing methyl methacrylate instead of methacrylic acid in the latex polymer (Comparative Example 1) result in fiber mats having comparable strength and thickness swelling but much greater bowing. The anionic stabilized styrene-acrylate dispersion (Comparative Example C-2) results in significantly poorer sample specimens, not only in terms of thickness swelling but also in terms of strength and bowing. The subsequent blending of this dispersion with a soluble acid polymer, as can also be used to prepare the polymer dispersions of the invention, results likewise in fiber mats having markedly poorer mechanical characteristics, as shown clearly by Comparative Example C-3. Furthermore, the subsequent addition of the polyacid to the polymer dispersion results in compositions of very high viscosity.

TABLE 1

Characteristics of the heat-cured jute-sisal fiber mats

| | Sample | | | | | | |
|---|---|---|---|---|---|---|---|
| | 2 | 3 | 6 | 7 | C-1 | C-2 | C-3 |
| Board thickness [mm] | 2.00 | 1.97 | 1.96 | 1.97 | 1.94 | 1.95 | 1.98 |
| Density [g/cm$^3$] | 0.73 | 0.75 | 0.74 | 0.74 | 0.79 | 0.74 | 0.75 |
| TS 2 h [%] | 19 | 20 | 14 | 13 | 18 | 36 | 27 |
| TS 24 h [%] | 21 | 22 | 19 | 18 | 20 | 61 | 36 |
| S 24 h [rating 1–5] | 1 | 1 | 1 | 1 | 1 | 2 | 2 |
| S 7 d [rating 1–5] | 1 | 1 | 1 | 1 | 1 | 4 | 3 |
| B 24 h [mm] | 7 | 3 | 5 | 5 | 14 | 25 | 23 |
| B 7 d [mm] | 16 | 8 | 10 | 12 | 25 | >50 | 26 |

Determination of the gel content of the compositions of the invention

In order to determine the water resistance, it is possible to use the gel con tent of the heat-cured composition s of the invention, i.e., the water-insoluble fraction. For this purpose, selected examples and comparative examples are cast to give films about 5 mm thick which are dried to constant weight at 50° C. in a circulating-air drying cabinet for several days. The films are then cured at 150° C. for 15 minutes. The material obtained in this way is stored in water at 60° C. for 24 hours and, shortly after storage in water, the gel content can be determined as the ratio of the cured film weight before and after water storage.

The gel fractions determined in th is way for selected examples and comparative examples are set out in Table 2. The formulations investigated were in each case the pure polymer dispersions and also mixtures thereof with in each case 6% by weight of triethanolamine and 2% by weight of hypophosphorous acid (based on nonvolatile fractions of the polymer dispersions).

TABLE 2

Gel content of the polymer dispersions of the invention and mixtures

| Sample | Gel content [%] (dispersion) | Gel content [%] (mixture) |
| --- | --- | --- |
| Example 2 | 87 | 93 |
| Example 7 | 84 | 98 |
| Comparative Example 1 | 82 | 84 |
| Comparative Example 2 | 84 | 72 |
| Comparative Example 3 | 64 | 77 |

The results obtained make it clear that the dispersions of the invention following thermal curing have a high gel content which can be increased further by adding a polyfunctional alcohol and a reaction accelerant. Comparative Example C-1 (without methacrylic acid in the latex polymer) shows a somewhat lower gel content; with this sample, it is not possible to increase the level by adding triethanolamine and hypophosphorous acid. The styrene-acrylate dispersion (Comparative Example C-2) likewise shows a gel content of more than 80%, but when triethanolamine and reaction accelerant are added there is a reduction in the gel content. Blending the styrene-acrylate dispersion with the polyacid (Comparative Example C-3) shows comparatively low gel contents with and without the addition of triethanolamine and reaction accelerant.

Determination of the pendulum hardness of the compositions of the invention

A particular feature of the compositions of the invention is the increase in hardness of their films following heat curing. To illustrate this phenomenon, selected examples and comparative examples and mixtures thereof with in each case 6% by weight of triethanolamine and 2% by weight of hypophosphorous acid (based on nonvolatile fractions of the polymer dispersions) are used to produce films having a thickness of about 100 $\mu$m on glass supports by drying at 23° C. for several days. The pendulum hardness of these films is determined following thermal conditioning at 160° C. for 10 minutes and using a pendulum hardness measuring instrument from Byk Mallinckrodt GmbH.

The results obtained, which are set out in Table 3, make it clear that the film hardness of the polymer dispersions of the invention can be increased markedly by thermal conditioning at 160° C. for 10 minutes. The same applies to sample 5, which on the basis of its low glass transition temperature has comparatively low pendulum values. The addition of triethanolamine and hypophosphorous acid leads, it is true, to the observation of a slight decrease in the pendulum hardness, i.e., a softening of the films, prior to heat curing. After thermal conditioning, however, these samples have higher measured values than the pure dispersions.

TABLE 3

Pendulum hardness of the polymer dispersions of the invention and mixtures

| | Pendulum hardness [s] (dispersion) | | Pendulum hardness [s] (mixture) | |
| --- | --- | --- | --- | --- |
| Sample | before conditioning | after conditioning | before conditioning | after conditioning |
| Example 1 | 132 | 216 | 120 | 239 |
| Example 2 | 129 | 220 | 120 | 240 |
| Example 5 | 32 | 131 | 30 | 184 |

We claim:
1. A polymer dispersion comprising in an aqueous medium
   a) dispersed particles of a polymer composed of units of ethylenically unsaturated monomers of which more than from 5 to 20% by weight are $\alpha,\beta$-ethylenically unsaturated mono- or dicarboxylic acids;
   b) a dissolved polymer containing in copolymerized form from 60 to 100% by weight of at least one $\alpha,\beta$-ethylenically unsaturated mono- or dicarboxylic acid, or salts thereof; and
   c) an amine of the formula I

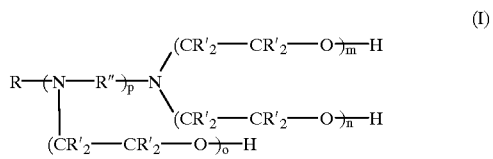

in which
R is an alkyl or alkylene radical having at least 6 carbon atoms or an alkylphenyl radical having at least 6 carbon atoms in the alkyl group;
R' independently at each occurrence is H or $C_{1-4}$ alkyl;
R" is $C_{1-4}$ alkylene;
m, n and o independently of one another are a number $\geq 0$, with the proviso that at least one value of m, n and o is other than 0,
is 0 or 1,
the weight ratio, based on solids, of the dispersed particles to dissolved polymer being in the range from 7:1 to 1:7 and the weight ratio of dissolved polymer to amine being in the range from 20:1 to 2:1;
said polymer dispersion being obtainable by emulsion polymerization of said ethylenically unsaturated monomers in the presence of said dissolved polymer and of said amine of the formula I.

2. A polymer dispersion as claimed in claim 1, wherein the weight ratio of the dispersed particles to dissolved polymer is in the range from 5:1 to 1:5.

3. A polymer dispersion as claimed in claim 1, wherein the at least one $\alpha,\beta$-ethylenically unsaturated mono- or dicarboxylic acid is selected from the group consisting of acrylic acid, methacrylic acid, itaconic acid, maleic acid, fumaric acid and crotonic acid.

4. A polymer dispersion as claimed in claim 1, wherein the dispersed particles consist of a copolymer of (meth)acrylic acid with one or more monomers selected from the group consisting of $C_1$–$C_{12}$ alkyl (meth)acrylates, $C_{1-12}$ hydroxyalkyl (meth)acrylates, styrene, butadiene, and vinyl acetate.

5. A polymer dispersion as claimed in claim 1, wherein the dissolved polymer is a (meth)acrylic acid copolymer having a weight average molecular weight of less than 100 kg/mol.

6. A heat-curable composition comprising a polymer dispersion as claimed in claim 1, a multifunctional alcohol and, optionally, a reaction accelerant.

7. A heat-curable composition as claimed in claim 6, wherein the polyfunctional alcohol is an amino alcohol.

8. A heat-curable composition as claimed in claim 6 or 7, wherein the reaction accelerant is a phosphorous compound.

9. A heat-curable composition as claimed in claim 6 or 7, wherein the multifunctional alcohol is present in an amount, relative to the polymer dispersion, such that the weight ratio of dissolved polymer to multifunctional alcohol is in the range from 100:1 to 1:1.

10. A heat-curable composition as claimed in any of claims 6 to 7, containing from 0.1 to 5% by weight of reaction accelerant, based on the total weight of nonvolatile constituents of the composition.

11. A polymer dispersion as claimed in claim 2, wherein the dissolved polymer is a (meth)acrylic acid copolymer having a weight average molecular weight of less than 100 kg/mol.

12. The heat-curable composition as claimed in claim 6, wherein the reaction accelerant is a phosphorus compound and wherein the multifunctional alcohol is present in an amount, relative to the polymer dispersion, such that the weight ratio of dissolved polymer to multifunctional alcohol is in the range of from 100:1 to 1:1.

* * * * *

UNITED STATES PATENT AND TRADEMARK OFFICE
CERTIFICATE OF CORRECTION

PATENT NO. : 6,262,159 B1
DATED : July 17, 2001
INVENTOR(S) : Stefan Dreher et al.

It is certified that error appears in the above-identified patent and that said Letters Patent is hereby corrected as shown below:

Column 5,
Line 19, "particles. of these" should read -- particles. Of these --;
Line 63, "250 s$_{-1}$" should read -- 250 s$^{-1}$ --;

Column 14,
Line 67, "666 mpas" should read -- 666 mPas --;

Column 18,
Line 50, "con tent" should read -- content -- and "composition s" should read -- compositions --;

Column 20,
Line 46, "is 0 or 1" should read -- p is 0 or 1 --.

Signed and Sealed this

Eleventh Day of January, 2005

JON W. DUDAS
*Director of the United States Patent and Trademark Office*